United States Patent
Toyota et al.

(10) Patent No.: US 6,815,467 B2
(45) Date of Patent: Nov. 9, 2004

(54) METHODS FOR PRODUCING A POLYOL AND A POLYMER DISPERSED POLYOL

(75) Inventors: Yoshinori Toyota, Kanagawa (JP); Akio Horie, Ibaraki (JP); Hiroshi Wada, Ibaraki (JP); Kayoko Sugiyama, Kanagawa (JP); Etsuko Akagi, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 13 days.

(21) Appl. No.: 10/197,528

(22) Filed: Jul. 18, 2002

(65) Prior Publication Data

US 2003/0100801 A1 May 29, 2003

(30) Foreign Application Priority Data

Jul. 18, 2001 (JP) ........................................ 2001-218348
Feb. 8, 2002 (JP) ........................................ 2002-032839

(51) Int. Cl.$^7$ ............................................. C08G 18/28
(52) U.S. Cl. ..................... 521/174; 521/170; 528/52; 528/56; 528/57; 528/59; 528/76; 528/77; 528/425; 568/620; 568/624
(58) Field of Search ................. 521/170, 174; 528/52, 56, 57, 59, 76, 77, 425; 568/620, 624

(56) References Cited

U.S. PATENT DOCUMENTS

| | | | |
|---|---|---|---|
| 5,093,380 A | 3/1992 | Takeyasu et al. | 521/131 |
| 5,100,922 A | 3/1992 | Wada et al. | |
| 5,437,822 A | 8/1995 | Wada et al. | 264/45.5 |
| 5,605,939 A | 2/1997 | Hager | 521/137 |
| 5,648,559 A | 7/1997 | Hager | 568/620 |
| 5,700,847 A | * 12/1997 | Thompson | 521/159 |
| 6,066,683 A | 5/2000 | Beisner et al. | 521/174 |
| 6,313,060 B1 | 11/2001 | Sugiyama et al. | 502/175 |

FOREIGN PATENT DOCUMENTS

| | | |
|---|---|---|
| EP | 0 677 543 | 10/1995 |
| EP | 0 807 651 A1 | 11/1997 |
| EP | 0 992 523 A1 | 4/2000 |
| EP | 1 022 300 A1 | 7/2000 |
| EP | 1 022 300 | 7/2000 |
| JP | 2-276821 | 11/1990 |
| JP | 8-231676 | 9/1996 |
| WO | WO 91/18909 | 12/1991 |
| WO | WO 01/79325 | 10/2001 |

OTHER PUBLICATIONS

U.S. patent application Ser. No. 10/211,585, Toyota et al., filed Aug. 5, 2002.
U.S. patent application Ser. No. 10/265,663, Toyota et al., filed Oct. 8, 2002.
U.S. patent application Ser. No. 10/197,528, Toyota et al., filed Jul. 18, 2002.

* cited by examiner

*Primary Examiner*—Rosalynd Keys
(74) *Attorney, Agent, or Firm*—Oblon, Spivak, McClelland, Maier & Neustadt, P.C.

(57) ABSTRACT

A method for producing a polyoxyalkylene polyol which comprises subjecting propylene oxide and ethylene oxide to ring-opening addition polymerization with an initiator in the presence of a catalyst, wherein the polyoxyalkylene polyol is a polyoxyalkylene polyol obtained by subjecting propylene oxide to ring-opening addition polymerization with an initiator in the presence of a double metal cyanide complex catalyst to form an oxypropylene block chain, subjecting ethylene oxide and propylene oxide to ring-opening addition polymerization randomly to form an oxyalkylene random chain, changing the catalyst and subjecting ethylene oxide to ring-opening addition polymerization in the presence of an alkali metal catalyst to form an oxyethylene block chain, and the polyoxyalkylene polyol is a polyoxyalkylene polyol having a hydroxyl value of from 5 to 56 mgKOH/g, a proportion of an initiator residue of at most 25 mass %, a proportion of the oxypropylene block chain of from 5 to 50 mass %, a total oxyethylene group content of from 5 to 60 mass %, and a ratio of primary hydroxyl groups among terminal hydroxyl groups of at least 60 mol %.

18 Claims, No Drawings

METHODS FOR PRODUCING A POLYOL AND A POLYMER DISPERSED POLYOL

The present invention relates to methods for producing a polyoxyalkylene polyol and a polymer dispersed polyol. The polyoxyalkylene polyol and the polymer dispersed polyol obtained by the production methods of the present invention are widely used as a material of an elastomer, a synthetic resin, a coating and a sealing material, or as a surfactant, a lubricant, a diluent, a plasticizer, etc. Particularly when they are used as a material for producing a flexible polyurethane foam (hereinafter referred to as flexible foam), a flexible foam having improved mechanical properties such as hardness, moldability, vibrating property and durability can be obtained.

Heretofore, various studies have been conducted to improve properties of a flexible foam. For example, in order to improve comfort of a seat cushion of e.g. an automobile to sit on, improvement of e.g. impact resilience, vibrating property and durability has been desired. Further, in recent years, along with a change in taste of users for comfort to sit on, a flexible foam having a low impact resilience coefficient has been desired. With regard to the vibrating property, it is considered to be effective to make decrement in a frequency region to which human is sensitive (considered to be from 4 to 8 Hz for example, or from 6 to 20 Hz) particularly significant. In order to improve such properties, it is considered to be effective to produce a seat cushion by employing a polyoxyalkylene polyol having a higher molecular weight.

A polyoxyalkylene polyol (hereinafter referred to as polyol) used as a material of a flexible foam is usually produced by subjecting an alkylene oxide such as propylene oxide to ring-open addition polymerization with e.g. a polyhydric alcohol as an initiator by using a sodium type catalyst such as sodium hydroxide or a potassium type catalyst such as potassium hydroxide. By this production method, a monool having unsaturated bonds (unsaturated monool) is formed as a by-product, and the formation amount of the unsaturated monool increases along with decrease in the hydroxyl value (increase in the molecular weight) of the polyol.

In production of a polyol having a hydroxyl value at a level of 56 mgKOH/g which is widely used as a material of a flexible foam, the formation amount of the unsaturated monool is not so large as to be a serious problem. However, in production of a polyol having a high molecular weight and a low hydroxyl value, the formation amount of the unsaturated monool tends to be problematic. In a case where a flexible foam is produced by using a polyol having a high degree of total unsaturation, problems such as decrease in hardness, deterioration of permanent compression set and deterioration of curing property at the time of molding tend to occur. Further, in a case where a polyol having a low hydroxyl value is produced by using a sodium type catalyst or a potassium type catalyst, the degree of total unsaturation tends to be remarkably high, and the production is very difficult.

As a method of producing a polyol having a low degree of total unsaturation and a low hydroxyl value, a production method of subjecting an alkylene oxide to ring-opening addition polymerization by using a double metal cyanide complex as a catalyst is proposed in JP-A-2-276821. Although comfort to sit on remarkably improves when a high molecular weight polyol obtained by this production method is used, there may be a problem in moldability such as air flow, required in addition to comfort to sit on, in some cases. Practically, such a polyol alone is used to produce a flexible foam, degree of closed-cell tends to be relatively high, thus leading to a defect at the time of crushing treatment in some cases.

As a method to overcome the problem of moldability, a method for producing a flexible foam by using as the material a polyol mixture comprising a polyol produced by using a double metal cyanide complex catalyst and a polyol produced by using potassium hydroxide is proposed in JP-A-8-231676. However, in this method, as the polyol produced by using a double metal cyanide complex catalyst, a polyoxyalkylene polyol produced by subjecting propylene oxide alone to ring-opening addition polymerization with an initiator and then subjecting ethylene oxide alone to ring-opening addition polymerization, is used, and further, the degree of unsaturation of the polyol produced by using a potassium hydroxide catalyst is high, and the degree of unsaturation of the entire polyol mixture is thereby high, whereby durability of the foam tends to be insufficient.

Further, as another method, a method of using a double metal cyanide complex catalyst, subjecting a mixture of ethylene oxide with another alkylene oxide to ring-opening addition polymerization reaction system with an initiator to produce a polyol having a random addition structure of ethylene oxide with another alkylene oxide in the molecule of the polyol, and using this polyol to form a flexible foam having favorable moldability, is proposed in U.S. Pat. Nos. 5,605,939 and 5,648,559. However, the present inventors have tried to produce a flexible foam for an automobile seat by using a polyol in Examples as disclosed in the above patents, but a foam could not be produced as depressions (collapses) were formed in the inside and on the surface of the foam.

Under these circumstances, the present invention has been made to overcome the above problems, and it is an object of the present invention to provide methods for producing a material polyol and a polymer dispersed polyol, which provide, in production of a flexible foam using as the material a polyol produced by using a double metal cyanide complex catalyst, a flexible foam having favorable foam moldability maintained, having good physical properties such as hardness and vibrating property, and having favorable durability particularly heat and humidity permanent compression set.

The present invention provides a method for producing a polyoxyalkylene polyol, which comprises subjecting propylene oxide and ethylene oxide to ring-opening addition polymerization with an initiator in the presence of a catalyst, wherein the polyoxyalkylene polyol is a polyoxyalkylene polyol obtained by subjecting propylene oxide to ring-opening addition polymerization with an initiator in the presence of a double metal cyanide complex catalyst to form an oxypropylene block chain, subjecting ethylene oxide and propylene oxide to ring-opening addition polymerization randomly to form an oxyalkylene random chain, changing the catalyst and subjecting ethylene oxide to ring-opening addition polymerization in the presence of an alkali metal catalyst to form an oxyethylene block chain, and the polyoxyalkylene polyol is a polyoxyalkylene polyol having a hydroxyl value of from 5 to 56 mgKOH/g, a proportion of an initiator residue of at most 25 mss %, a proportion of the oxypropylene block chain of from 5 to 50 mass %, a total oxyethylene group content of from 5 to 60 mass %, and a ratio of primary hydroxyl groups among terminal hydroxyl groups of at least 60 mol %.

The present invention further provides a method for producing a polymer dispersed polyol, which comprises polymerizing a monomer having polymerizable unsaturated groups employing the polyoxyalkylene polyol obtained by the above production method as a dispersion medium.

Now, the present invention will be described in detail with reference to the preferred embodiment.

Structure of Polyol (1)

The polyoxyalkylene polyol (hereinafter referred to as polyol (1)) of the present invention is a polyoxyalkylene polyol obtained in such a manner that propylene oxide is subjected to ring-opening addition polymerization with an initiator in the presence of a double metal cyanide complex catalyst to form an oxypropylene block chain, ethylene oxide and propylene oxide are subjected to ring-opening addition polymerization randomly to form an oxyalkylene random chain, then the catalyst is changed, and ethylene oxide is subjected to ring-opening addition polymerization in the presence of an alkali metal catalyst to form an oxyethylene block chain.

Namely, the polyol (1) has an initiator residue (i), an oxypropylene block chain (ii), an oxyalkylene random chain (iii) and an oxyethylene block chain (iv) in its molecule.

Initiator Residue (i)

As the initiator for the polyol (1) of the present invention, an active hydrogen compound such as a polyhydric alcohol, an amine or a condensed type compound may be used. Here, the initiator residue (i) is a moiety in the polyol (1) derived from the initiator. The proportion of the initiator residue (i) is preferably at most 25 mass % based on the entire polyol (1), preferably from 2 to 20 mass %.

Specific examples of the initiator include polyhydric alcohols such as ethylene glycol, propylene glycol, 1,4-butanediol, glycerol, trimethylolpropane, pentaerythritol, diglycerol, meso-erythritol, methyl glucoside, glucose, sorbitol and sucrose; amines such as ethylenediamine, diethylenediamine, triethylenediamine, diaminodiphenylmethane, hexamethylenediamine and propylenediamine; and condensed type compounds such as phenol resins and novolac resins.

Such active hydrogen compounds may be used in combination of at least two. Among these active hydrogen compounds, preferred is a polyhydric alcohol. Particularly, an at least trivalent polyhydric alcohol is preferred in such a viewpoint that hardness of a flexible foam employing as the material a polyol produced by using such a polyhydric alcohol as the initiator is likely to be obtained.

Further, as the initiator, a compound obtained by subjecting an alkylene oxide in a small amount to ring-opening addition polymerization with the above compound may also be used. The alkylene oxide is preferably propylene oxide. The molecular weight of the obtained compound is preferably at least 650.

Most preferred as the initiator is a compound having a hydroxyl value of from 150 to 250 mgKOH/g, obtained by subjecting propylene oxide to ring-opening addition polymerization with an at least trivalent polyhydric alcohol.

Oxypropylene Block Chain (ii)

The polyol (1) of the present invention has an oxypropylene block chain (ii) formed by using a double metal cyanide complex catalyst, adjacent to the initiator residue (i). The proportion of the oxypropylene block chain (ii) is from 5 to 50 mass % based on the entire polyol (1), preferably from 10 to 40 mass %. The proportion of the oxypropylene block chain (ii) is particularly preferably from 20 to 30 mass %, whereby hardness of the flexible foam can be controlled high. If the oxypropylene block chain exceeds 50 mass %, degree of closed-cell of the flexible foam tends to be high, whereby moldability tends to deteriorate, and the curing property tends to deteriorate, whereby hardness is less likely to be obtained. Further, if the oxypropylene block chain (ii) is less than 5 mass %, hardness of the flexible foam is less likely to be obtained.

Here, in a case where a compound obtained by subjecting propylene oxide to ring-opening addition polymerization with an at least trivalent polyhydric alcohol is used as the initiator, the oxypropylene block chain in the initiator residue (i) and the oxypropylene block chain (ii) formed by using a double metal cyanide complex catalyst can not be distinguished even when the obtained polyol (1) is analyzed. Accordingly, in a case of verification as the polyol (1), the oxypropylene block chain of the initiator residue (i) and the oxypropylene block chain (ii) formed by using a double metal cyanide complex catalyst are not distinguished. Namely, the total proportion of the initiator residue (i) and the oxypropylene block chain (ii) is preferably from 5 to 75 mass %, more preferably from 12 to 60 mass %, based on the entire polyol (1).

Further, when the polyol (1) wherein the oxypropylene block chain (ii) is adjacent to the initiator residue (i) and another polyol are compared, the former is preferred, which has favorable moldability. Further, the oxypropylene block chain (ii) is produced by using the above double metal cyanide complex catalyst, whereas if another catalyst is used, an unsaturated monool is produced as a by-product, and durability of a flexible foam employing the obtained polyol as the material tends to deteriorate, such being unfavorable.

Oxyalkylene Random Chain (iii)

The polyol (1) of the present invention has an oxyalkylene random chain (iii) formed by using a double metal cyanide complex catalyst adjacent to the oxypropylene block chain (ii). The oxyalkylene random chain is a structure obtained by supplying ethylene oxide and propylene oxide in a predetermined proportion to the reaction system, and subjecting to ring-opening addition polymerization randomly. The proportion of the oxyalkylene random chain (iii) is preferably from 5 to 90 mass % based on the entire polyol (1), preferably from 10 to 80 mass %.

The content of oxyethylene groups in the oxyalkylene random chain (iii) in the polyol (1) of the present invention is preferably from 3 to 35 mass %, more preferably from 5 to 30 mass %, based on the oxyalkylene random chain (iii). Namely, the proportion of ethylene oxide to propylene oxide supplied to the reaction system is preferably from 3/97 to 35/65, more preferably from 5/95 to 30/70, in a mass ratio (ethylene oxide/propylene oxide). In a case where the oxyethylene group in the oxyalkylene random chain (iii) is less than this range or exceeds this range, degree of closed-cell of the flexible foam tends to be high, and the moldability may deteriorate in some cases, such being unfavorable.

Further, when ethylene oxide and propylene oxide are supplied to the reaction system in a predetermined proportion, the proportion may be changed during the supplying. By such a method, the content of oxyethylene groups in the oxyalkylene random chain (iii) can be controlled in the desired portion of the molecule. For example, in a case where the proportion of ethylene oxide is increased in stages, a polyol (1) wherein the content of oxyethylene groups becomes high towards the terminal of the molecule of the polyol (1) can be produced.

Oxyethylene Block Chain (iv)

The polyol (1) of the present invention has an oxyethylene block chain (iv) produced by using an alkali metal catalyst adjacent to the oxyalkylene random chain (iii) i.e. at the terminal of the molecule. The content of this oxyethylene block chain (iv) is preferably from 3 to 40 mass %, more preferably from 5 to 30 mass %, based on the entire polyol (1). If the oxyethylene block chain (iv) exceeds 40 mass %, shrinkage is likely to occur even after crushing treatment, such being unfavorable. Further, if the oxyethylene block chain (iv) is less than 3 mass %, e.g. collapses of the foam are likely to occur in production of the flexible foam, and the production tends to be difficult.

Composite Metal Cyanide Complex Catalyst

The polyol (1) of the present invention is obtained by subjecting the above-described specific alkylene oxides to ring-opening addition polymerization with an initiator in the presence of the double metal cyanide complex catalyst. As the double metal cyanide complex catalyst, compounds as disclosed in JP-B-46-27250 may, for example, be mentioned. Particularly, a complex containing zinc hexacyanocobaltate as the main component is preferred, and its ether and/or alcohol complexes are more preferred. By using such a double metal cyanide complex catalyst, the amount of by-product unsaturated monool can be suppressed, and durability of the flexible foam employing the obtained polyol as the material tends to improve.

Further, the above ether is not particularly limited, but is preferably a compound of the following formula (hereinafter referred to as compound (X)):

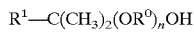

$$R^1-C(CH_3)_2(OR^0)_n OH$$

wherein $R^1$ is a methyl group or an ethyl group, $R^0$ is an ethylene group or a group having a hydrogen atom of an ethylene group substituted with a methyl group or an ethyl group, and n is an integer of from 1 to 3. $R^0$ is particularly preferably a group selected from an ethylene group, a propylene group, an ethylethylene group, a 1,2-dimethylethylene group and a 1,1-dimethylethylene group.

As the compound (X), specifically, compounds as disclosed in WO00/02951 may be mentioned. Specifically, the following compounds are preferred.

In a case where n is 1, preferred are ethylene glycol mono-tert-butyl ether, propylene glycol mono-tert-butyl ether, ethylene glycol mono-tert-pentyl ether and propylene glycol mono-tert-pentyl ether. In a case where n is 2, diethylene glycol mono-tert-butyl ether and diethylene glycol mono-tert-pentyl ether are preferred. In a case where n is 3, triethylene glycol mono-tert-butyl ether and triethylene glycol mono-tert-pentyl ether are preferred. Further, as the compound (X), a compound wherein n is 1 is particularly preferred, and a compound wherein $R^1$ is a methyl group is most preferred. Further, as the compound (X), at least two compounds may be used together.

The above alcohol is not particularly limited and methanol, ethanol, 1-propanol, 2-propanol, 1-butanol, 2-butanol, tert-butyl alcohol, pentanol and octanol may, for example, be mentioned, and among them, it is preferred to use tert-butyl alcohol.

In a case where the compound (X) and another compound are used together as organic ligands, the compound to be used together is preferably one or at least two compounds selected from the group consisting of tert-butyl alcohol, 1-butanol, 2-butanol, tert-pentyl alcohol, isopentyl alcohol, N,N-dimethylacetoamide, glyme (ethylene glycol dimethyl ether), diglyme (diethylene glycol dimethyl ether) triglyme (triethylene glycol dimethyl ether), 2-propanol and dioxane. The dioxane may be either 1,4-dioxane or 1,3-dioxane, and 1,4-dioxane is preferred. As the compound to be used together, tert-butyl alcohol, tert-pentyl alcohol or glyme is particularly preferred, and tert-butyl alcohol is most preferred.

Namely, specific examples of the double metal cyanide complex to be used in the present invention include a zinc hexacyanocobaltate-ethylene glycol mono-tert-butyl ether complex, a zinc hexacyanocobaltate-ethylene glycol mono-tert-butyl ether/tert-butyl alcohol complex, a zinc hexacyanocobaltate-tert-butyl alcohol complex and a zinc hexacyanocobaltate-glyme complex. Among them, particularly preferred are a zinc hexacyanocobaltate-ethylene glycol mono-tert-butyl ether complex and a zinc hexacyanocobaltate-ethylene glycol mono-tert-butyl ether/tert-butyl alcohol complex.

Alkali Metal Catalyst

The alkali metal catalyst to be used for formation of the oxyethylene block chain (iv) may be a sodium type catalyst, a potassium type catalyst or a cesium type catalyst. The sodium type catalyst may, for example, be a sodium metal, a sodium alkoxide such as sodium methoxide, sodium hydroxide or sodium carbonate. The same applies to the potassium type catalyst and the cesium type catalyst.

In production of the polyol (1) of the present invention, as the method of changing the double metal cyanide complex catalyst to the alkali metal catalyst, the alkali metal catalyst may be added to the reaction system after the double metal cyanide complex catalyst is deactivated, or the alkali metal catalyst may be added to the reaction system without deactivation. In the latter case, the double metal cyanide complex catalyst is deactivated by addition of the alkali metal catalyst. As the deactivation method, a treatment by putting water, an acid or an alkali, or a treatment by putting an adsorbent may, for example, be mentioned.

Properties of Polyol (1)

The hydroxyl value of the polyol (1) of the present invention is from 5 to 56 mgKOH/g, more preferably from 10 to 42 mgKOH/g. If the hydroxyl value exceeds 56 mgKOH/g and the molecular weight is low, elasticity of the obtained flexible foam tends to be insufficient. Further, if the hydroxyl value is less than 5 mgKOH/g, hardness of the obtained flexible foam is less likely to be obtained.

The number of hydroxyl groups in the polyol (1) of the present invention is preferably from 2 to 8, more preferably from 2.7 to 7, most preferably from 2.8 to 5.2. Here, the number of hydroxyl groups is an average number of active hydrogen in the initiator. If the number of hydroxyl groups is less than 2, the obtained flexible foam tends to be soft, and the durability tends to deteriorate. If the number of hydroxyl groups exceeds 8, the obtained flexible foam tends to be hard, and mechanical properties such as elongation tend to deteriorate.

The degree of unsaturation of the polyol (1) of the present invention is preferably at most 0.03 meq/g, more preferably at most 0.025 meq/g. If the degree of unsaturation exceeds 0.03 meq/g, i.e. if the amount of the unsaturated monool is large, durability and comfort to sit on of the obtained flexible foam tend to deteriorate. As the index of the durability of the flexible foam, dry heat permanent compression set and heat and humidity permanent compression set may be mentioned. The higher the degree of unsaturation, the higher the value of the permanent compression set, and the poorer the durability tends to be. Further, as the index of the comfort to sit on of the flexible foam, the resonance frequency may be mentioned. Such a correlation that as the resonance frequency decreases, transmissibility at 6 Hz at which human feels most uncomfortable tends to decrease, and thus the resonance frequency is suitable as the index.

The total oxyethylene group content (i.e. the content of all oxyethylene groups contained in the initiator residue (i), oxyalkylene random chain (iii) and oxyethylene block chain (iv)) in the polyol (1) of the present invention is from 5 to 60 mass %, more preferably from 10 to 40 mass %. Further, the proportion of primary hydroxyl groups among terminal hydroxyl groups of the polyol, derived from the oxyethylene block chain (iv) at the terminal of the molecule of the polyol (1) of the present invention, i.e. the ratio of primary hydroxyl groups among terminal hydroxyl groups is preferably at least 60 mol %, more preferably from 80 to 95 mol %.

Polymer Dispersed Polyol

The present invention further provides a method for producing a polymer dispersed polyol wherein polymer fine particles are stably dispersed in the polyol (1). The polymer dispersed polyol is a dispersion system wherein polymer fine particles (dispersoid) are stably dispersed in the base polyol (dispersion medium). Namely, the polymer dispersed polyol of the present invention is a polymer dispersed polyol wherein the above-described polyol (1) is employed as the base polyol.

The polymer as the polymer fine particles may be an addition polymerization type polymer or a condensation polymerization type polymer. The addition polymerization type polymer may be obtained, for example, by homopolymerizing or copolymerizing a monomer such as acrylonitrile, styrene, a methacrylate ester or an acrylate ester. The condensation polymerization type polymer may, for example, be polyester, polyurea, polyurethane or melamine.

Presence of polymer fine particles in the polyol suppresses the hydroxyl value of the polyol low, and is effective to improve physical properties such as hardness and air flow of the flexible foam. The content of the polymer fine particles in the polymer dispersed polyol is not particularly limited, but is preferably at most 50 mass %, more preferably from 3 to 40 mass %. In a case where the mass of the polyol is employed for calculation, the mass of the polymer fine particles is not included.

Use of Polyol (1)

The polyol (1) and the polymer dispersed polyol of the present invention are widely used as a material of a flexible foam, an elastomer, a synthetic resin, a coating and a sealing material, or as a surfactant, a lubricant, a diluent, a plasticizer, etc. They are particularly preferably used as a material for producing a flexible foam, whereby moldability of the foam, and vibrating property and physical properties such as hardness of the flexible foam to be obtained tend to improve. As a method for producing a flexible foam, a method may usually be mentioned wherein a polyol compound and a polyisocyanate compound are reacted in the presence of a blowing agent and a catalyst, and in the presence of a foam stabilizer, a crosslinking agent or a cell opener as the case requires.

As the polyol compound (including a polymer dispersed polyol) to be reacted in production of the flexible foam, a polyol mixture containing the polyol (1) of the present invention and/or the polymer dispersed polyol of the present invention is preferably used. As the polyol mixture, the polyol (polyol (1) or polymer dispersed polyol) of the present invention alone may be used, or another polyol may be used together. The another polyol is not particularly limited so long as it is a polyol used for production of the flexible foam, but is preferably a polyoxyalkylene polyol, preferably a polyoxyalkylene polyol having a total oxypropylene group content of at least 40 mass %. Among polyols to be reacted in production of the flexible foam, the content of the polyol of the present invention is preferably at least 20 mass %, more preferably at least 30 mass %, particularly preferably at least 50 mass %. Further, at least two polyols of the present invention as mixed may be used. However, the polyol compound (mixture) does not include a crosslinking agent and a cell opener as mentioned hereinafter.

The hydroxyl value of the polyol mixture is preferably from 5 to 56 mgKOH/g, more preferably from 10 to 42 mgKOH/g. Further, the degree of total unsaturation of the polyol mixture is preferably at most 0.05 meq/g, more preferably at most 0.03 meq/g, most preferably at most 0.025 meq/g. Further, the average ratio of primary hydroxyl groups among terminal hydroxyl groups of the polyol mixture is preferably at least 60 mol %.

The polyisocyanate compound is not particularly limited, and aromatic, alicyclic and aliphatic polyisocyanates having at least two isocyanate groups; a mixture of at least two of the above polyisocyanates; and a modified polyisocyanate obtained by modification thereof may, for example, be mentioned. Specific examples thereof include polyisocyanates such as tolylene diisocyanate (TDI), diphenylmethane diisocyanate (MDI), polymethylene polyphenyl isocyanate (common name: crude MDI), xylylene diisocyanate (XDI), isophorone diisocyanate (IPDI) and hexamethylene diisocyanate (HMDI), and prepolymer type modified products, isocyanurate type modified products, urea type modified products and carbodiimide type modified products thereof. Among them, preferred are TDI, MDI, crude MDI and modified product thereof.

The amount of the polyisocyanate compound used is usually represented by isocyanate index (a value represented by 100 times the proportion of the number of isocyanate groups based on the total number of active hydrogen of e.g. polyol, crosslinking agent, cell opener and water). The amount of the polyisocyanate compound used in the present invention is preferably from 80 to 120, more preferably from 85 to 110, as represented by the isocyanate index.

The blowing agent is not particularly limited, but is preferably at least one member selected from water and inert gases. As the inert gas, the air, nitrogen or carbon dioxide gas may, for example, be mentioned. Among them, water is preferred. The amount of the blowing agent is not particularly limited, and in a case where water is used, it is preferably at most 10 parts by mass, more preferably from 0.1 to 8 parts by mass, per 100 parts by mass of the polyol compound.

The above catalyst is not particularly limited so long as it is a catalyst which accelerates a urethanating reaction, and it may, for example, be a tertiary amine such as triethylenediamine, bis(2-dimethylaminoethyl)ether or N,N,N',N'-tetramethylhexamethylenediamine; a metal carboxylate such as potassium acetate or potassium 2-ethylhexanoate; or an organic metal compound such as dibutyltin dilaurate.

The foam stabilizer is not particularly limited, and it may, for example, be a silicone type foam stabilizer or a fluorine type foam stabilizer, and a silicone type foam stabilizer is preferred. By using such a foam stabilizer, homogeneous cell structure can be formed.

As the crosslinking agent, preferred is a compound having at least two functional groups having active hydrogen such as a hydroxyl group, a primary amino group or a secondary amino group. The hydroxyl value of the crosslinking agent is preferably at least 100 mgKOH/g, more preferably 150 mgKOH/g, particularly preferably at least 200 mgKOH/g. Further, at least two crosslinking agents may be used together.

Specific examples thereof include compounds such as ethylene glycol, propylene glycol, 1,4-butanediol, neopentyl glycol, 1,6-hexanediol, diethylene glycol, triethylene glycol, dipropylene glycol, glycerol, trimethylol propane, pentaerythritol, diglycerol, dextrose, sorbitol, sucrose, monoethanolamine, diethanolamine, triethanolamine, bisphenol A, ethylenediamine, 3,5-diethyl-2,4 (or 2,6)-diaminotoluene (DETDA), 2-chloro-p-phenylenediamine (CPA), 3,5-bis(methylthio)-2,4 (or 2,6)-diaminotoluene, 1-trifluoromethyl-3,5-diaminobenzene, 1-trifluoromethyl-4-chloro-3,5-diaminobenzene, 2,4-toluenediamine, 2,6-toluenediamine, bis(3,5-dimethyl-4-aminophenyl)methane, 4,4'-diaminodiphenylmethane, m-xylylenediamine, 1,4-diaminohexane, 1,3-bis(aminomethyl)cyclohexane and isophorone diamine, and compounds obtained by adding a relatively small amount of an alkylene oxide thereto.

The cell opener is preferably a polyoxyalkylene polyol having a number of hydroxyl group of at least 2, a hydroxyl value of from 20 to 180 mgKOH/g and an oxyethylene group content exceeding 60 mass %. By using such a cell opener, moldability of the flexible foam tends to be improved, specifically, the crushing load tends to be suppressed low. The amount of the cell opener used is preferably from 0.1 to 5 parts by mass per 100 parts by mass of the polyol compound.

In production of the flexible foam, in addition to the above components, a surfactant such as an emulsifying agent or a foam stabilizer; an aging preventing agent such as an antioxidant or a ultraviolet ray absorbent; a filler such as calcium carbonate or barium sulfate; or a known additive or assistant such as a flame retardant, a plasticizer, a colorant or an antifungal agent, may be used as the case requires.

As the method of forming a flexible foam, a method of pouring a reactive mixture directly into a mold by means of a low pressure foaming machine or a high pressure foaming machine is preferred. Particularly preferred is a method of molding in a closed mold (molding method). In the present invention, the flexible foam may be produced either by a cold curing method or a hot curing method, but a cold curing method is preferred.

The flexible foam produced by using as the material the polyol (1) or the polymer dispersed polyol of the present invention, is useful for e.g. a cushion, a mattress or a seat. It is particularly suitable as a seat for vehicles such as automobiles.

Now, the present invention will be described in further detail with reference to Examples. However, it should be understood that the present invention is by no means restricted to such specific Examples.

Values in foaming formulation in Examples and Comparative Examples represent parts by mass.

Examples X1 to X8 are Production Examples of polyoxyalkylene polyols of the present invention (Examples of the present invention), Examples X9 to X17 are Production Examples of comparative polyoxyalkylene polyols (Comparative Examples), and Example X18 is a Production Example of a polyol used as as cell opener.

Properties of polyols obtained in Production Examples are shown in Table 1. As properties, the following items are shown. The proportion (unit: mass %) of an oxypropylene block chain adjacent to the initiator, (hereinafter referred to as "PO part (1)") the proportion (unit: mass %) of an oxypropylene block chain not directly connected to the initiator (hereinafter referred to as "PO part (2)"), the proportion (unit: mass %) of an oxyalkylene random chain (hereinafter referred to as "random portion (1), random portion (2)"), the oxyethylene group content (unit: mass %) at each of the random part (1) and the random part (2) (hereinafter referred to as EO amount), the proportion (unit: mass %) of the oxyethylene block chain at the terminal (hereinafter referred to as "EO part"), the hydroxyl value (unit: mgKOH/g), the ratio of primary hydroxyl groups among terminal hydroxyl groups (unit: mol %) and the degree of unsaturation (unit: meq/g).

The hydroxyl value and the degree of unsaturation were measured by a method in accordance with JIS K-1557. In Production Examples, a DMC-METB complex catalyst is meant for a zinc hexacyanocobaltate-ethylene glycol mono-tert-butyl ether complex catalyst, a DMC-METB/TBA complex catalyst is meant for a zinc hexacyanocobaltate-ethylene glycol mono-tert-butyl ether/tert-butyl alcohol complex catalyst, a DMC-TBA complex catalyst is meant for a zinc hexacyanocobaltate-tert-butyl alcohol complex catalyst, and a DMC-glyme complex catalyst is meant for a zinc hexacyanocobaltate-glyme complex catalyst.

The initiator 1 is a compound having a hydroxyl value of 168 mgKOH/g obtained by adding propylene oxide to glycerol, and the initiator 2 is a compound having a hydroxyl value of 234 mgKOH/g obtained by adding propylene oxide to glycerol.

POLYOL PRODUCTION EXAMPLES

EXAMPLE X1

Production of Polyol A1

1,525 g of propylene oxide was subjected to a reaction by using a DMC-METB complex catalyst in the presence of 1,000 g of the initiator 1 at about 120° C., and then 2,833 g of an ethylene oxide/propylene oxide mixture containing 11.6 mass % of ethylene oxide was reacted therewith at about 120° C. Then, potassium hydroxide was added to the reaction system to change the catalyst to potassium hydroxide, and using this potassium hydroxide catalyst, 1,097 g of ethylene oxide was reacted therewith at about 120° C., and the production was completed. After the reaction, a treatment with an adsorbent (synthetic magnesium silicate) and filtration were carried out to obtain polyol A1 having a hydroxyl value of 27.3 mgKOH/g.

EXAMPLE X2

Production of Polyol A2

Polyol A2 having a hydroxyl value of 27.8 mgKOH/g was obtained in the same manner as in the production of polyol A1 except that 2,833 g of an ethylene oxide/propylene oxide mixture having an ethylene oxide content of 23.2 mass % was used.

EXAMPLE X3

Production of Polyol B1

2,279 g of propylene oxide was subjected to a reaction by using a DMC-METB complex catalyst in the presence of 1,000 g of the initiator 1 at about 120° C., and then 2,278 g of an ethylene oxide/propylene oxide mixture containing 14.4 mass % of ethylene oxide was reacted therewith at about 120° C., then 905 g of ethylene oxide was reacted by using a sodium methoxide catalyst at about 120° C., and the production was completed. After the reaction, a treatment with an adsorbent (synthetic magnesium silicate) and filtration were carried out to obtain polyol B1 having a hydroxyl value of 27.6 mgKOH/g.

EXAMPLE X4

Production of Polyol B2

Polyol B2 having a hydroxyl value of 27.8 mgKOH/g was obtained in the same manner as in the production of polyol B1 except that a DMC-METB/TBA complex catalyst was used instead of the DMC-METB complex catalyst.

EXAMPLE X5

Production of Polyol B3

Polyol B3 having a hydroxyl value of 27.7 mgKOH/g was obtained in the same manner as in the production of polyol B1 except that a DMC-glyme complex catalyst was used instead of the DMC-METB complex catalyst.

EXAMPLE X6

Production of Polyol C 2,473 g of propylene oxide was subjected to a reaction by using a DMC-METB complex catalyst in the presence of 1,000 g of the initiator 1 at about 120° C., and then 2,174 g of an ethylene oxide/propylene oxide mixture containing 14.4 mass % of ethylene oxide was reacted therewith at about 120° C., then 627 g of ethylene oxide was reacted therewith by using a sodium methoxide catalyst at about 120° C., and the production was completed. After the reaction, a treatment with an adsorbent (synthetic magnesium silicate) and filtration were carried out to obtain polyol C having a hydroxyl value of 28.1 mgKOH/g.

EXAMPLE X7

Production of Polyol D 3,137 g of propylene oxide was subjected to a reaction by using a DMC-METB complex catalyst in the presence of 1,000 g of the initiator 1 at about 120° C., and then 1,259 g of an ethylene oxide/propylene oxide mixture containing 14.4 mass % of ethylene oxide was reacted therewith at about 120° C., then 878 g of ethylene oxide was reacted therewith by using a potassium hydroxide catalyst at about 120° C., and the production was completed. After the reaction, a treatment with an adsorbent (synthetic magnesium silicate) and filtration were carried out to obtain polyol D having a hydroxyl value of 28.3 mgKOH/g.

EXAMPLE X8

Production of Polyol E 630 g of propylene oxide was subjected to a reaction by using a DMC-METB complex catalyst in the presence of 1,000 g of the initiator 1 at about 120° C., and then 4,014 g of an ethylene oxide/propylene oxide mixture containing 11 mass % of ethylene oxide was reacted therewith at about 120° C., then 691 g of ethylene oxide was reacted therewith by using a potassium hydroxide catalyst at about 120° C., and the production was completed. After the reaction, a treatment with an adsorbent (synthetic magnesium silicate) and filtration were carried out to obtain polyol E having a hydroxyl value of 27.8 mgKOH/g.

EXAMPLE X9

Production of Polyol F1

2,833 g of an ethylene oxide/propylene oxide mixture containing 11.6 mass % of ethylene oxide was subjected to a reaction by using a DMC-METB complex catalyst in the presence of 1,000 g of the initiator 1 at about 120° C., and then 1,525 g of propylene oxide was reacted therewith at about 120° C., then 1,097 g of ethylene oxide was reacted therewith by using a potassium hydroxide catalyst at about 120° C., and the production was completed. After the reaction, a treatment with an adsorbent (synthetic magnesium silicate) and filtration were carried out to obtain polyol F1 having a hydroxyl value of 27.9 mgKOH/g.

EXAMPLE X10

Production of Polyol F2

Polyol F2 having a hydroxyl value of 26.9 mgKOH/g was obtained in the same manner as in the production of polyol F1 except that 2,833 g of an ethylene oxide/propylene oxide mixture having an ethylene oxide content of 23.2 mass % was used.

EXAMPLE X11

Production of Polyol G 3,817 g of propylene oxide was subjected to a reaction by using a DMC-METB complex catalyst in the presence of 1,000 g of the initiator 1 at about 120° C., and then 591 g of an ethylene oxide/propylene oxide mixture containing 21.4 mass % of ethylene oxide was reacted therewith at about 120° C., then 953 g of ethylene oxide was reacted therewith by using a potassium hydroxide catalyst at about 120° C., and the production was completed. After the reaction, a treatment with an adsorbent (synthetic magnesium silicate) and filtration were carried out to obtain polyol G having a hydroxyl value of 28.1 mgKOH/g.

EXAMPLE X12

Production of Polyol H 253 g of propylene oxide was subjected to a reaction by using a DMC-METB complex catalyst in the presence of 1,000 g of the initiator 1 at about 120° C., and then 4,387 g of an ethylene oxide/propylene oxide mixture containing 11 mass % of ethylene oxide was reacted therewith at about 120° C., then 695 g of ethylene oxide was reacted therewith by using a potassium hydroxide catalyst at about 120° C., and the production was completed. After the reaction, a treatment with an adsorbent (synthetic magnesium silicate) and filtration were carried out to obtain polyol H having a hydroxyl value of 27.9 mgKOH/g.

EXAMPLE X13

Production of Polyol J 252 g of propylene oxide was subjected to a reaction by using a DMC-TBA complex catalyst in the presence of 720 g of the initiator 2 at about 120° C., and then 4,487 g of an ethylene oxide/propylene oxide mixture containing 13 mass % of ethylene oxide was reacted therewith at about 120° C., then 813 g of an ethylene oxide/propylene oxide mixture containing 40 mass % of ethylene oxide was reacted therewith at about 120° C., and the production was completed. After the reaction, a treatment with an adsorbent (synthetic magnesium silicate) and filtration were carried out to obtain polyol J having a hydroxyl value of 27.9 mgKOH/g.

EXAMPLE X14

Production of Polyol K 5,550 g of propylene oxide was subjected to a reaction by using a DMC-METB complex catalyst in the presence of 1,000 g of the initiator 1 at about 120° C., and then 1,103 g of an ethylene oxide was reacted therewith by using a potassium hydroxide catalyst at about 120° C., and the production was completed. After the reaction, a treatment with an adsorbent (synthetic magnesium silicate) and filtration were carried out to obtain polyol K having a hydroxyl value of 23.9 mgKOH/g.

EXAMPLE X15

Production of Polyol L1

6,467 g of propylene oxide was subjected to a reaction by using a potassium hydroxide catalyst in the presence of 1,000 g of the initiator 1 at about 110° C., and then 1,423 g of ethylene oxide was reacted therewith at about 110° C., and the production was completed. After the reaction, a treatment with an adsorbent (synthetic magnesium silicate) and filtration were carried out to obtain polyol L1 having a hydroxyl value of 24 mgKOH/g.

EXAMPLE X16
Production of Polyol L2

5,378 g of propylene oxide was subjected to a reaction by using a potassium hydroxide catalyst in the presence of 1,000 g of the initiator 1 at about 110° C., and then 1,257 g of ethylene oxide was reacted therewith at about 110° C., and the production was completed. After the reaction, a treatment with an adsorbent (synthetic magnesium silicate) and filtration were carried out to obtain polyol L2 having a hydroxyl value of 27.9 mgKOH/g.

EXAMPLE X17
Production of Polyol L3

4,416 g of propylene oxide was subjected to a reaction by using a potassium hydroxide catalyst in the presence of 1,000 g of the initiator 1 at about 110° C., and then 904 g of ethylene oxide was reacted therewith at about 110° C., and the production was completed. After the reaction, a treatment with an adsorbent (synthetic magnesium silicate) and filtration were carried out to obtain polyol L3 having a hydroxyl value of 35.5 mgKOH/g.

EXAMPLE X18
Production of Polyol T 5,000 g of an ethylene oxide/propylene oxide mixture containing 80 mass % of ethylene oxide was subjected to a reaction by using a potassium hydroxide catalyst in the presence of 1,000 g of the initiator 1 at about 120° C., and the production was completed. After the reaction, a treatment with an adsorbent (synthetic magnesium silicate) and filtration were carried out to obtain polyol T having a hydroxyl value of 27.9 mgKOH/g.

TABLE 2

| | |
|---|---|
| Crosslinking agent a1 | Propylene oxide/ethylene oxide addition product of sorbitol, hydroxyl value: 450 mgKOH/g |
| Crosslinking agent a2 | Diethanolamine |
| Catalyst b1 | Dipropylene glycol (DPG) solution of triethylenediamine (TEDA L-33, tradename, manufactured by TOSOH CORPORATION) |
| Catalyst b2 | DPG solution of bis-[(2-dimethylamino)ethyl]ether (TOYOCAT ET, tradename, manufactured by TOSOH CORPORATION) |
| Foam stabilizer c | Silicone foam stabilizer (SRX-274C, tradename, manufactured by TORAY SILICONE) |
| Cell opener | Polyol T |
| Blowing agent | Water |
| Polyol N | Polymer dispersed polyol wherein acrylonitrile/styrene copolymer particles (20 mass %) are dispersed in polyol A1 (80 mass %) as a dispersion medium |
| Polyol P | Polymer dispersed polyol wherein acrylonitrile/styrene copolymer particles (20 mass %) are dispersed in polyol C (80 mass %) as a dispersion medium |
| Polyol Q | Polymer dispersed polyol wherein acrylonitrile/styrene copolymer particles (20 mass %) are dispersed in polyol K (80 mass %) as a dispersion medium |
| Polyol R | Polymer dispersed polyol wherein acrylonitrile/styrene copolymer particles (20 mass %) are dispersed in polyol L2 (80 mass %) as a dispersion medium |
| Polyol S | Polymer dispersed polyol wherein acrylonitrile/styrene copolymer particles (22 mass %) are dispersed in polyol L3 (78 mass %) as a dispersion medium |
| Polyisocyanate | Mixture of TDI-80 (mixture of 2,4-TDI/2,6-TDI = 80/20 mass %)/crude MDI = 80/20 mass %, isocyanate group content: 44.8 mass % (Coronate 1021, tradename, manufactured by NIPPON POLYURETHANE INDUSTRY CO., LTD.) |

TABLE 1

| Polyol | PO part (1) Pro-portion | Random part (1) Pro-portion | Random part (1) EO amount | Random part (2) Pro-portion | Random part (2) EO amount | PO part (2) Pro-portion | EO part Pro-portion | Hydroxyl value | Ratio of hydroxyl groups being primary hydroxyl groups | Degree of unsaturation |
|---|---|---|---|---|---|---|---|---|---|---|
| A1 | 23.6 | 43.9 | 11.6 | — | — | — | 17 | 27.3 | 87 | 0.016 |
| F1 | — | 43.9 | 11.6 | — | — | 23.6 | 17 | 27.9 | 87 | 0.014 |
| A2 | 23.6 | 43.9 | 23.2 | — | — | — | 17 | 27.8 | 87 | 0.012 |
| F2 | — | 43.9 | 23.2 | — | — | 23.6 | 17 | 26.9 | 87 | 0.010 |
| B1 | 35.3 | 35.3 | 14.4 | — | — | — | 14 | 27.6 | 86 | 0.016 |
| B2 | 35.3 | 35.3 | 14.4 | — | — | — | 14 | 27.8 | 86 | 0.009 |
| B3 | 35.3 | 35.3 | 14.4 | — | — | — | 14 | 27.7 | 86 | 0.018 |
| C | 39.4 | 34.7 | 14.4 | — | — | — | 10 | 28.1 | 83 | 0.015 |
| D | 50.0 | 20.0 | 14.4 | — | — | — | 14 | 28.3 | 87 | 0.014 |
| E | 9.9 | 63.4 | 11 | — | — | — | 11 | 27.8 | 83 | 0.016 |
| G | 60 | 9.3 | 21.4 | — | — | — | 15 | 28.1 | 86 | 0.019 |
| H | 4.0 | 69.3 | 11 | — | — | — | 11 | 27.9 | 83 | 0.011 |
| J | 4.0 | 71.5 | 13 | 13.0 | 40 | — | — | 27.9 | 19 | 0.010 |
| K | 72.5 | — | — | — | — | — | 14.4 | 23.9 | 87 | 0.020 |
| L1 | 72.7 | — | — | — | — | — | 16 | 24 | 87 | 0.085 |
| L2 | 70.4 | — | — | — | — | — | 16.5 | 27.9 | 87 | 0.065 |
| L3 | 69.9 | — | — | — | — | — | 14.3 | 35.5 | 75 | 0.060 |

A flexible polyurethane foam was produced by using materials shown in Table 2 in an amount shown in Table 3 or 4. A mixture of all the materials except for polyisocyanate (polyol system) and a polyisocyanate compound were respectively adjusted to have a liquid temperature of 25±1° C., the polyisocyanate compound was added to the polyol system, followed by mixing with stirring by a high-speed mixer for 5 seconds, and the mixture was immediately poured and closed in an aluminum mold in a size of 400 mm lengthwise and breadthwise and 100 mm in height, heated to 60° C. After curing for 6 minutes, a polyurethane foam was taken out and left to stand for at least 24 hours, and then various physical properties were measured. The results are shown in Tables 3 and 4.

The crushing property was evaluated as the characteristics of the moldability. The crushing property was evaluated by productivity when the foam was compressed up to 25% of the thickness of the foam and the foam cells were released, immediately after the foam was taken out from the mold (400 mm×400 mm×100 mm), and evaluated in accordance with such evaluation standards that ○: good, Δ: rather poor. Further, the load applied to the surface of 400 mm×400 mm at the time of compression was evaluated as the crushing load (unit: N). Here, the measurement methods of the foam physical properties were in accordance with the following methods, and with regard to the core density, one cut into a size of 100 mm lengthwise and breadthwise and 50 mm in height, having the skin portion removed from the center portion of the foam, was used for measurement.

With regard to the resonance frequency, there is a correlation between the molded foam for test piece having a size of 400 mm×400 mm×100 mm and an actual molded foam for a seat cushion, and the actual molded foam tends to have a resonance frequency higher than that of the test piece by from about 0.2 to about 1 Hz, depending upon e.g. the thickness and shape in general.

The degree of unsaturation in Tables 3 and 4 is the degree of total unsaturation (unit: meq/g) of the polyol or the base polyol in the polymer dispersed polyol.

Now, standards used for measurement of the physical properties of the flexible foam are shown below.

Overall density (unit: $kg/m^3$), core density (unit: $kg/m^3$), 25%-ILD hardness (unit: $N/314\ cm^2$), core impact resilience coefficient (unit: %), tear strength (N/cm), tensile strength (kPa), elongation (%), dry heat permanent compression set (unit: %) and heat and humidity permanent compression set (unit: %) were measured by methods in accordance with JIS K6400. Hysteresis loss (unit: %) was measured by a method in accordance with JASO B407-87. Resonance frequency (unit: Hz) and transmissibility at 6 Hz were measured by methods in accordance with JASO B407-87 (excitation amplitude: ±2.5 mm, pressing plate: iron abrasive plate, load: 490 N).

TABLE 3

| Examples | 1 | 2 | 3 | 4 | 5 | 6 | 7 | 8 | 9 |
|---|---|---|---|---|---|---|---|---|---|
| Polyol | A1:60 R:40 | A2:60 N:20 R:20 | B1:60 R:40 | B2:60 R:40 | B3:60 R:40 | C:60 R:40 | L2:60 N:40 | D:70 N:30 | E:60 P:20 R:20 |
| Degree of total unsaturation (meq/g) | 0.033 | 0.023 | 0.033 | 0.028 | 0.034 | 0.032 | 0.048 | 0.015 | 0.024 |
| Crosslinking agent a1 | 3.0 | 3.0 | 3.0 | 3.0 | 3.0 | 3.0 | 3.0 | 3.0 | 3.0 |
| Crosslinking agent a2 | 1.0 | 1.0 | 1.0 | 1.0 | 1.0 | 1.0 | 1.0 | 1.0 | 1.0 |
| Catalyst b1 | 0.5 | 0.5 | 0.5 | 0.5 | 0.5 | 0.5 | 0.5 | 0.5 | 0.5 |
| Catalyst b2 | 0.12 | 0.12 | 0.12 | 0.12 | 0.12 | 0.12 | 0.12 | 0.12 | 0.12 |
| Foam stabilizer c | 1.0 | 1.0 | 1.0 | 1.0 | 1.0 | 1.0 | 1.0 | 1.0 | 1.0 |
| Blowing agent | 3.0 | 3.0 | 3.0 | 3.0 | 3.0 | 3.0 | 3.0 | 3.0 | 3.0 |
| Isocyanate index | 105 | 105 | 105 | 105 | 105 | 105 | 105 | 105 | 105 |
| Moldability | ○ | ○ | ○ | ○ | ○ | ○ | ○ | ○ | ○ |
| Overall density ($kg/m^3$) | 48.1 | 47.3 | 48.7 | 48.3 | 48.7 | 48.9 | 48.5 | 48.3 | 48.7 |
| Core density ($kg/m^3$) | 42.5 | 41.2 | 42.6 | 42.3 | 42.6 | 42.7 | 42.8 | 42.5 | 42.5 |
| 25%-ILD hardness ($N/314\ cm^2$) | 246 | 214 | 206 | 202 | 198 | 205 | 225 | 210 | 211 |
| Core impact resilience coefficient (%) | 63 | 62 | 64 | 64 | 64 | 66 | 63 | 62 | 63 |
| Tear strength (N/cm) | 6.4 | 6.2 | 6.5 | 6.2 | 6.0 | 6.2 | 6.4 | 6.5 | 6.2 |
| Tensile strength (kPa) | 140 | 138 | 145 | 137 | 133 | 140 | 145 | 146 | 139 |
| Elongation (%) | 103 | 105 | 102 | 106 | 102 | 105 | 105 | 96 | 104 |
| Dry heat permanent compression set (%) | 3.8 | 4.5 | 3.1 | 2.9 | 4.6 | 4.6 | 4.3 | 4.5 | 4.4 |
| Heat and humidity permanent compression set (%) | 12.0 | 12.5 | 11.3 | 10.9 | 12.8 | 12.5 | 12.8 | 12.8 | 12.3 |
| Hysteresis loss (%) | 19.4 | 20.4 | 18.9 | 18.7 | 21.0 | 18.4 | 20.0 | 19.6 | 18.5 |
| Resonance frequency (Hz) | 3.35 | 3.55 | 3.40 | 3.38 | 3.60 | 3.50 | 3.59 | 3.55 | 3.50 |
| Transmissibility at 6 Hz | 0.69 | 0.75 | 0.73 | 0.70 | 0.78 | 0.75 | 0.77 | 0.78 | 0.73 |
| Crushing load (N) | 960 | 980 | 686 | 588 | 1176 | 451 | 637 | 1019 | 637 |

TABLE 4

| Examples | 10 | 11 | 12 | 13 | 14 | 15 | 16 | 17 | 18 |
|---|---|---|---|---|---|---|---|---|---|
| Polyol | A1:60 R:40 | D:70 N:30 | F1:60 R:40 | K:20 L2:50 Q:30 | L1:60 R:40 | G:60 R:40 | H:60 R:40 | J:60 S:40 | F2:60 R:40 |
| Degree of total unsaturation (meq/g) | 0.033 | 0.015 | 0.032 | 0.044 | 0.078 | 0.035 | 0.030 | 0.027 | 0.029 |
| Crosslinking agent a1 | 3.0 | 3.0 | 3.0 | 3.0 | 3.0 | 3.0 | 3.0 | 3.0 | 3.0 |
| Crosslinking agent a2 | 1.0 | 1.0 | 1.0 | 1.0 | 1.0 | 1.0 | 1.0 | 1.0 | 1.0 |
| Catalyst b1 | 0.5 | 0.5 | 0.5 | 0.5 | 0.5 | 0.5 | 0.5 | 0.5 | 0.5 |
| Catalyst b2 | 0.12 | 0.12 | 0.12 | 0.12 | 0.12 | 0.12 | 0.12 | 0.12 | 0.12 |
| Foam stabilizer c | 1.0 | 1.0 | 1.0 | 1.0 | 1.0 | 1.0 | 1.0 | 1.0 | 1.0 |
| Cell opener | 1.0 | 3.0 | — | — | — | — | — | — | — |
| Blowing agent | 3.0 | 3.0 | 3.0 | 3.0 | 3.0 | 3.0 | 3.0 | 3.0 | 3.0 |
| Isocyanate index | 105 | 105 | 105 | 105 | 105 | 105 | 105 | 105 | 105 |

TABLE 4-continued

| Examples | 10 | 11 | 12 | 13 | 14 | 15 | 16 | 17 | 18 |
|---|---|---|---|---|---|---|---|---|---|
| Moldability | ◯ | ◯ | Puncture | Δ | ◯ | Δ | ◯ | Collapses | Puncture |
| Overall density (kg/m$^3$) | 48.4 | 48.6 | | 48.9 | 48.2 | 48.8 | 47.9 | | |
| Core density (kg/m$^3$) | 42.8 | 42.7 | | 42.6 | 43.7 | 42.1 | 41.8 | | |
| 25%-ILD hardness (N/314 cm$^2$) | 238 | 220 | | 213 | 176 | 160 | 159 | | |
| Core impact resilience coefficient (%) | 65 | 64 | | 69 | 67 | 63 | 65 | | |
| Tear strength (N/cm) | 6.0 | 6.3 | | 6.1 | 6.2 | 6.0 | 5.18 | | |
| Tensile strength (kPa) | 135 | 141 | | 146 | 135 | 127 | 120 | | |
| Elongation (%) | 107 | 104 | | 110 | 107 | 100 | 100 | | |
| Dry heat permanent compression set (%) | 3.1 | 2.9 | | 5.1 | 7.9 | 5.1 | 4.3 | | |
| Heat and humidity permanent compression set (%) | 10.3 | 9.8 | | 14.5 | 18.6 | 15.5 | 14.8 | | |
| Hysteresis loss (%) | 17.0 | 17.5 | | 18.8 | 23.0 | 21.6 | 20.8 | | |
| Resonance frequency (Hz) | 3.30 | 3.40 | | 3.60 | 4.85 | 3.70 | 3.65 | | |
| Transmissibility at 6 Hz | 0.65 | 0.65 | | 0.88 | 0.98 | 0.90 | 0.88 | | |
| Crushing load (N) | 588 | 735 | | 1470 | 235 | 1313 | 392 | | |

Examples 1 to 11 in Tables 3 and 4 are Examples of the present invention. As the polyol (1) produced in such a manner that propylene oxide is subjected to a reaction continuously in an amount of from 5 to 50 mass % adjacent to the initiator by using the double metal cyanide complex catalyst, ethylene oxide and propylene oxide are randomly reacted therewith, and then ethylene oxide is reacted therewith by using an alkali metal catalyst, is used as the material, a foam having favorable moldability, favorable physical properties such as hardness and vibrating property, and favorable durability particularly heat and humid permanent compression set can be obtained. Particularly in Examples 10 and 11, as the polyol T is used as the cell opener, the crushing load can be suppressed low, and favorable moldability is obtained.

Examples 12 to 18 in Table 4 are Comparative Examples.

In Examples 12 and 18, puncture was formed on the foam at the time of crushing treatment, whereby physical properties could not be measured.

In Examples 13, in order to make up for failure in moldability caused by the polyol K used as the material produced by using the double metal cyanide complex catalyst not having an oxyalkylene random chain, the polyol L2 synthesized by using a potassium hydroxide catalyst is mixed and used as the material, whereby the degree of total unsaturation of the polyol is high, and the durability is insufficient. Further, the moldability is not sufficient.

In Example 14, the polyol produced with a potassium hydroxide catalyst is used, whereby the durability is poor.

In Example 15, a polyol wherein the oxypropylene block chain adjacent to the initiator is 60 mass % based on the entire polyol is used, whereby the reactivity with the polyisocyanate is insufficient, and the hardness is low.

In Example 16, a polyol wherein the oxypropylene block chain adjacent to the initiator is 4 mass % based on the entire polyol is used, whereby the hardness is insufficient.

In Example 17, at the terminal of the polyol J produced by using the double metal cyanide complex catalyst, production was not terminated with the reaction of ethylene oxide, whereby collapses were generated and a foam could not be formed, and physical properties could not be measured.

By employing a polyol having a specific structure of the present invention, a flexible polyurethane foam having improved moldability, and favorable physical properties such as hardness and vibrating property can be obtained. Further, the polyol (1) of the present invention is produced by using a double metal cyanide complex catalyst, whereby physical properties such as durability particularly heat and humidity permanent compression set are also excellent.

The entire disclosure of Japanese Patent Application No. 2001-218348 filed on Jul. 18, 2001 and Japanese Patent Application No. 2002-32839 filed on Feb. 8, 2002 including specification, claims and summary are incorporated herein by reference in its entirety.

What is claimed is:

1. A method for producing a polyoxyalkylene polyol which comprises subjecting propylene oxide and ethylene oxide to ring-opening addition polymerization with an initiator in the presence of a catalyst, wherein the polyoxyalkylene polyol is a polyoxyalkylene polyol obtained by subjecting propylene oxide to ring-opening addition polymerization with an initiator in the presence of a double metal cyanide complex catalyst to form an oxypropylene block chain, subjecting ethylene oxide and propylene oxide to ring-opening addition polymerization randomly to form an oxyalkylene random chain, changing the catalyst and subjecting ethylene oxide to ring-opening addition polymerization in the presence of an alkali metal catalyst to form an oxyethylene block chain, and the polyoxyalkylene polyol is a polyoxyalkylene polyol having a hydroxyl value of from 5 to 56 mgKOH/g, a proportion of an initiator residue of at most 25 mass %, a proportion of the oxypropylene block chain of from 5 to 50 mass %, a total oxyethylene group content of from 5 to 60 mass %, and a ratio of primary hydroxyl groups among terminal hydroxyl groups of at least 60 mol %.

2. The method for producing a polyoxyalkylene polyol according to claim 1, wherein in the formation of the oxyalkylene random chain, the proportion of ethylene oxide to propylene oxide to be subjected to the ring-opening addition polymerization is within a range of from 3/97 to 35/65 in a mass ratio.

3. The method for producing a polyoxyalkylene polyol according to claim 1, wherein the proportion of the oxyethylene block chain in the polyoxyalkylene polyol is from 3 to 40 mass %.

4. The method for producing a polyoxyalkylene polyol according to claim 1, wherein the proportion of the oxyalkylene random chain in the polyoxyalkylene polyol is from 5 to 90 mass %.

5. The method for producing a polyoxyalkylene polyol according to claim 1, wherein the double metal cyanide complex catalyst has a compound of the following formula as at least part of organic ligands:

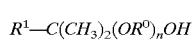

wherein $R^1$ is a methyl group or an ethyl group, $R^0$ is an ethylene group or a group having a hydrogen atom of an ethylene group substituted with a methyl group or an ethyl group, and n is an integer of from 1 to 3.

6. A method for producing a polymer dispersed polyol, which comprises polymerizing a monomer having polymerizable unsaturated groups by employing a polyoxyalkylene polyol as a dispersion medium, wherein the polyoxyalkylene polyol is one obtained by subjecting propylene oxide and ethylene oxide to ring-opening addition polymerization with an initiator in the presence of a catalyst; is a polyoxyalkylene polyol obtained by subjecting propylene oxide to ring-opening addition polymerization with an initiator in the presence of a double metal cyanide complex catalyst to form an oxypropylene block chain, subjecting ethylene oxide and propylene oxide to ring-opening addition polymerization randomly to form an oxyalkylene random chain, changing the catalyst and subjecting ethylene oxide to ring-opening addition polymerization in the presence of an alkali metal catalyst to form an oxyethylene block chain; and is a polyoxyalkylene polyol having a hydroxyl value of from 5 to 56 mgKOH/g, a proportion of an initiator residue of at most 25 mass %, a proportion of the oxypropylene block chain of from 5 to 50 mass %, a total oxyethylene group content of from 5 to 60 mass %, and a ratio of primary hydroxyl groups among terminal hydroxyl groups of at least 60 mol %.

7. The method for producing a polymer dispersed polyol according to claim 6, wherein in the formation of the oxyalkylene random chain, the proportion of ethylene oxide to propylene oxide to be subjected to the ring-opening addition polymerization is within a range of from 3/97 to 35/65 in a mass ratio.

8. The method for producing a polymer dispersed polyol according to claim 6, wherein the proportion of the oxyethylene block chain in the polyoxyalkylene polyol is from 3 to 40 mass %.

9. The method for producing a polymer dispersed polyol according to claim 6, wherein the proportion of the oxyalkylene random chain in the polyoxyalkylene polyol is from 5 to 90 mass %.

10. The method for producing a polymer dispersed polyol according to claim 6, wherein the double metal cyanide complex catalyst has a compound of the following formula as at least part of organic ligands:

$$R^1-C(CH_3)_2(OR^0)_nOH$$

wherein $R^1$ is a methyl group or an ethyl group, $R^0$ is an ethylene group or a group having a hydrogen atom of an ethylene group substituted with a methyl group or an ethyl group, and n is an integer of from 1 to 3.

11. A method for producing a flexible polyurethane foam which comprises reacting a polyol compound and a polyisocyanate compound in the presence of a blowing agent and a catalyst, wherein as the polyol compound, a polyol mixture containing the polyoxyalkylene polyol obtained by the production method as defined in claim 1 is used.

12. The method for producing a flexible polyurethane foam according to claim 11, wherein the degree of total unsaturation of the polyol compound is at most 0.05 meq/g.

13. The method for producing a flexible polyurethane foam according to claim 11, wherein a cell opener is added to produce the flexible polyurethane foam.

14. The method for producing a flexible polyurethane foam according to claim 11, wherein the flexible polyurethane foam is produced in a closed mold.

15. A method for producing a flexible polyurethane foam which comprises reacting a polyol compound and a polyisocyanate compound in the presence of a blowing agent and a catalyst, wherein as the polyol compound, a polyol mixture containing the polymer dispersed polyol obtained by the production method as defined in claim 6 is used.

16. The method for producing a flexible polyurethane foam according to claim 15, wherein the degree of total unsaturation of the polyol compound is at most 0.05 meq/g.

17. The method for producing a flexible polyurethane foam according to claim 15, wherein a cell opener is added to produce the flexible polyurethane foam.

18. The method for producing a flexible polyurethane foam according to claim 15, wherein the flexible polyurethane foam is produced in a closed mold.

* * * * *